United States Patent [19]
Miller et al.

[11] 3,713,278
[45] Jan. 30, 1973

[54] COMBINED MOISTURE SEPARATOR AND REHEATER

[75] Inventors: Edward H. Miller, Rexford, N.y.; Stephen Chesmejef, South Portland, Maine

[73] Assignee: General Electric Co.

[22] Filed: Nov. 18, 1968

[21] Appl. No.: 776,365

[52] U.S. Cl. ...................... 55/269, 55/418, 55/440, 55/463, 122/483
[51] Int. Cl. ............................................. B01d 45/08
[58] Field of Search ................ 122/34, 483, 488–491; 55/267–269, 418, 342, 343, 440, 463, DIG. 23; 165/113

[56] References Cited

UNITED STATES PATENTS

| | | | |
|---|---|---|---|
| 1,928,706 | 4/1930 | Sillers | 55/440 |
| 2,121,218 | 6/1938 | Erter | 165/113 |
| 2,895,566 | 7/1959 | Coulter | 55/DIG. 23 |
| 2,921,647 | 1/1960 | Pietrasz | 55/DIG. 23 |
| 2,412,713 | 11/1968 | Romanos | 122/34 |
| 3,472,209 | 10/1969 | Roffler | 122/491 |

FOREIGN PATENTS OR APPLICATIONS

931,235  7/1963  Great Britain .......................... 122/483

OTHER PUBLICATIONS

Proceedings of the American Power Conf.–Artusa "Turbines and Cycles for Nuclear Power Plant." Page 287 & pages 293 & 294.

*Primary Examiner*—Frank W. Lutter
*Assistant Examiner*—Bernard Nozick
*Attorney*—William C. Crutcher, Frank L. Neuhauser and Oscar B. Waddell

[57] ABSTRACT

A combined moisture separator and reheater suitable for a nuclear steam turbine-generator powerplant, wherein a single shell houses two banks of "wiggle plate" inertial separators fed in parallel along either side of the shell and two stages of steam reheating tubes disposed to reheat the steam and arranged to cause uniform flow through the moisture separators.

7 Claims, 5 Drawing Figures

PATENTED JAN 30 1973 3,713,278
SHEET 1 OF 2
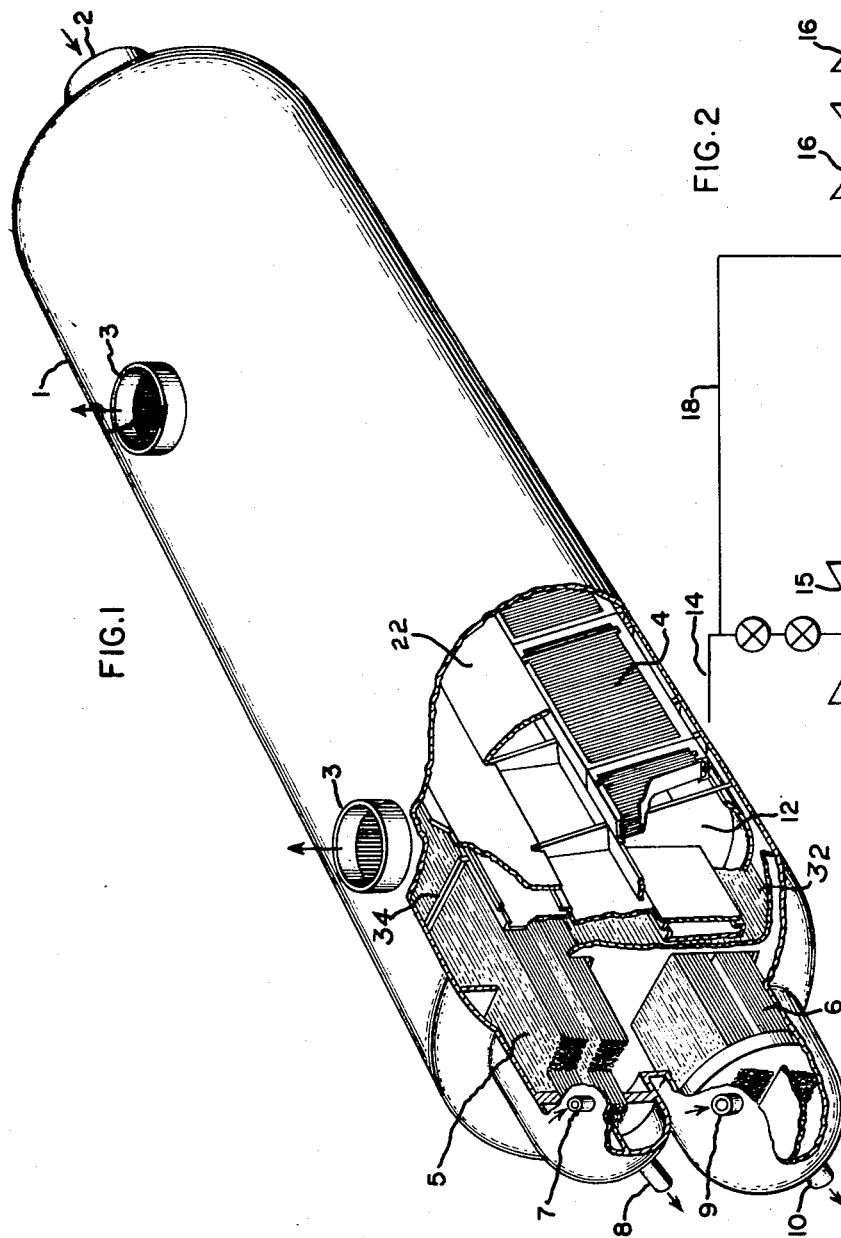
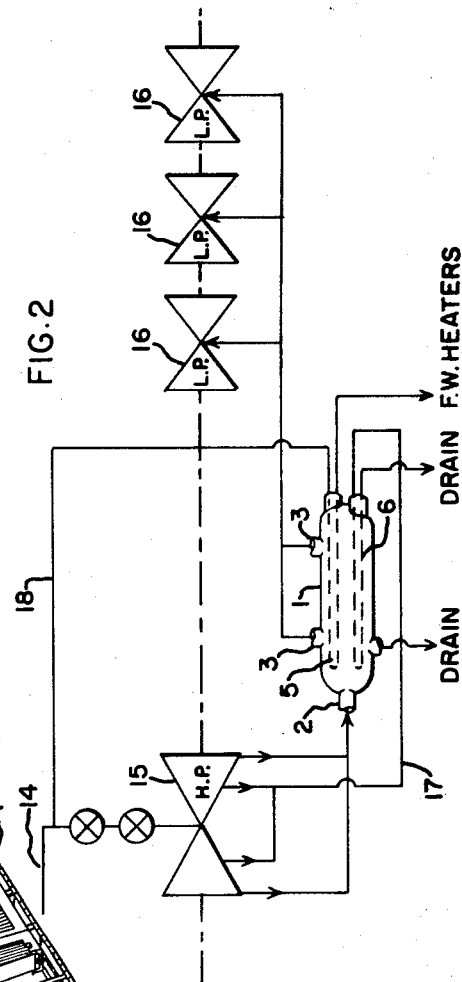
INVENTORS:
EDWARD H. MILLER,
STEPHEN CHESMEJEF,
BY W.C. Cutcher
THEIR ATTORNEY

INVENTORS:
EDWARD H. MILLER,
STEPHEN CHESMEJEF,

BY W.C. Crutcher

THEIR ATTORNEY.

«3,713,278»

COMBINED MOISTURE SEPARATOR AND REHEATER

BACKGROUND OF THE INVENTION

In nuclear powerplants, large quantities of steam are produced at relatively low pressure in comparison to fossil fuel powerplants. After expansion through the high pressure steam turbine, it is necessary to remove moisture from the steam and to reheat the steam before sending it to the low pressure turbine sections. The moisture separation and reheating steps must be carried out with overall minimum pressure drop of the steam and must be capable of handling high flow rates in units of minimum size.

It has been suggested to combine the moisture separator and the reheater elements in a single shell using demister-type separation in a horizontal wire mesh bed. This requires a rather large moisture separation unit with consequent large shell size in order to prevent excessive pressure drop through the separator/reheater.

Other types of separators include the inertial type which causes moisture separation by passing the steam along a zig-zag path. However, these require uniform flow distribution among the numerous moisture separator elements to obtain the most effective separation.

Accordingly, one object of the present invention is to provide an improved combined moisture separator and reheater suitable for a large nuclear powerplant.

Another object of the invention is to provide a combined moisture separator and reheater in a single shell of minimum size using inertial type separators and having good moisture separating capability with minimum pressure drop.

DRAWING

These and many other objects of the invention may best be understood by reference to the following description taken in connection with the accompanying drawing in which:

FIG. 1 is a perspective view, partly in section, of the combined moisture separator and two stage reheater, FIG. 2 is a simplified and partial schematic view of a steam turbine cycle showing the location of the separator/reheater, FIG. 3 is a transverse cross section taken through the separator/reheater vessel, FIG. 4 is a cutaway perspective drawing showing the inlet end of the unit, and FIG. 5 is a cross-sectional view through typical separator elements, taken along lines V—V of FIG. 3.

SUMMARY OF THE INVENTION

Briefly stated, the invention comprises a combined moisture separator and reheater with a single shell having baffle plates and inertial moisture separators disposed therein to divide the shell into two longitudinal steam supply manifolds on either side and a central upward reheating passage through the reheater tubes. Flow distribution plates subdivide the flow, and the reheater tubes are arranged so as to utilize the pressure drop through the tube bundles to force a uniform flow distribution over the moisture separator elements.

DESCRIPTION OF THE PREFERRED EMBODIMENT

Figures 3, 4, 5:
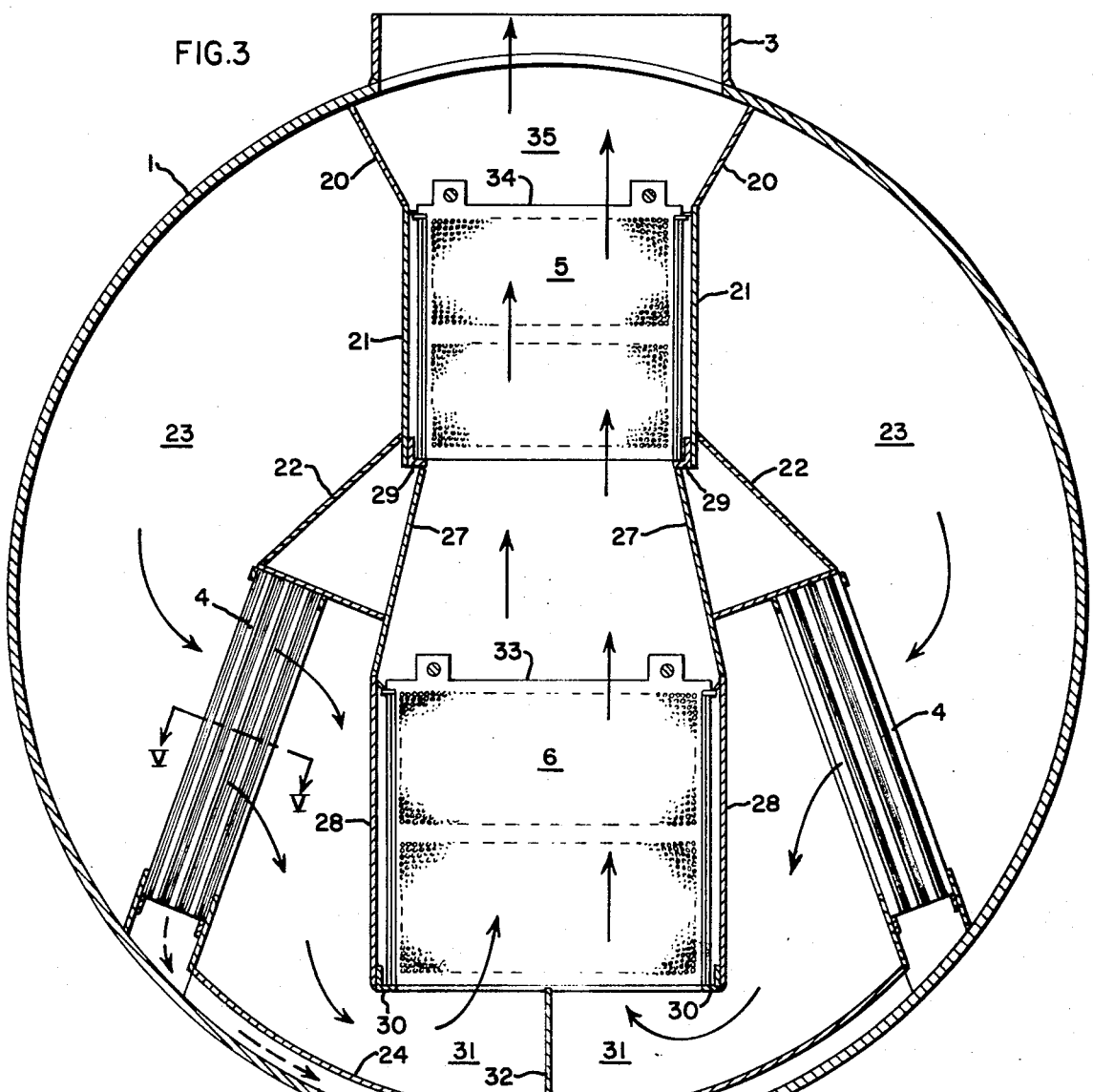

Referring to FIG. 1 of the drawing, the combined moisture separator and reheater is housed in a single shell designated as 1 having an inlet opening 2 at one end and outlet openings 3 at the top. Inside the shell 1 are banks of substantially vertical, but slightly inclined moisture separator elements 4 of a low pressure drop, inertial separation type, sometimes known as wiggle plate or zig-zag separators.

Passing through the middle portion of the shell 1 are horizontal finned tube reheating stages 5 and 6. Each stage is of the two-pass type. High temperature throttle steam enters inlet 7 and leaves outlet 8 to provide the second stage reheating. Lower pressure extraction steam enters inlet 9 and leaves outlet 10 to provide first stage or lower temperature reheating.

Inside the shell, longitudinal baffle plates such as 22 divide the interior longitudinally. Transverse flow distribution plates such as 12 in the vessel 1 and cooperatively aligned plates 34 supporting the reheat tubes divide the central portion of the vessel transversely.

Reference to FIG. 2 of the drawing illustrates the general environment of the invention. Steam from a source such as a nuclear reactor on the order of 900 psi absolute and 550°F is introduced from inlet line 14 to the high pressure turbine 15 and, after expansion, flows to the inlet 2 of the shell 1. The dry and reheated steam leaves outlets 3 and flows to the low pressure turbines 16. The first stage reheating tubes 6 are supplied with steam extracted from high pressure turbine 15 via line 17. The second stage reheating tubes 5 are supplied with higher temperature throttle steam via line 18.

Referring now to FIG. 3 of the drawing which is a cross section through the moisture separator/reheater, dual sets of longitudinal baffle plates 20, 21, 22 cooperate with dual banks of moisture separator elements 4 to define a pair of longitudinal supply manifolds 23 along the length of the shell 1 on either side thereof and symmetrically disposed. A longitudinally extending arcuate baffle 24 extends from one bank of moisture separator elements to the other and is radially spaced from the bottom wall of shell 1 to define a liquid collection channel 25 leading to a moisture removal pipe 26.

On either side of the vertical center line of the shell 1, another dual set of vertical plate members 27, 28 extend between angles 29, 30, which are arranged to support the respective second stage reheater tubes 5 and first stage reheater tubes 6. Together, the pairs of plates 20, 21, 27 and 28 form a vertical upward passage which conducts dry steam across the finned tube reheater banks.

At the bottom of the vessel and upstream of this vertical duct, a series of transverse, generally triangular plate members 12 (see FIG. 1) support the reheater stages and also separate the vessel into compartments 31. These compartments are further divided longitudinally by a plate 32 along the bottom of the vessel. Plate 32 prevents the possibility of pressure oscillations between opposite sides of the vessel.

Transverse compartmentalization is maintained through the reheaters 5, 6 by the tube supporting plates 33, 34. At the top of the vessel, the flow distributes along a single longitudinal discharge manifold 35 leading to the outlets 3.

Reference to FIG. 4 of the drawing shows the manner in which steam enters the unit at inlet 2 and is distributed to the two longitudinal manifolds 23. To accomplish this, a special diffusing impingement shield 36 is shaped to deflect the steam radially and to diffuse it. An end plate 37 prevents direct access of the steam into the reheater sections, so that it is forced to flow into the supply manifolds 23.

FIG. 5 shows a view through a typical moisture separator of a known type, wherein it is seen that separator elements 4 consist of zig-zag plate members having moisture collection flanges 4a. Steam flowing through the passages between the plates undergoes change of direction which causes droplets to pinge on the plates and be caught by the flanges 4a and drained downward as indicated by dashed arrows in FIG. 3 of the drawing.

The operation of the invention is best understood by reference to FIG. 3. The substantially vertical orientation of the moisture separators on opposite sides of the center line of the vessel and the vertically stacked disposition of the reheater tubes one stage above the other in the middle portion of the vessel provide a very compact design. Flow entering inlet 2 strikes the impingement shield 36 and diffuses into the two longitudinal manifolds 23. It distributes along a multiplicity of parallel paths transversely through the moisture separator elements as it passes longitudinally along the inside of the shell. From there the flow is compartmentalized by the transverse plates 12 and is directed from the lower compartments 31 upwardly through the first and second stage reheater tubes. These tubes are spaced and arranged to cause a relatively high pressure drop and high flow velocity through the reheater portion relative to the moisture separator portion, although the overall pressure drop through the unit is rather small.

For example, in the design shown, suitable for a nuclear powerplant, the flow velocity across the separator elements 4 is on the order of seven feet per second which achieves excellent moisture removal. The flow velocity through the reheater stages 5, 6 is on the order of 70 feet per second, or 10 times that through the moisture separator.

By appropriate selection of number of tube rows and tube spacing in the reheater, the flow area of the latter is chosen so that it is much smaller, relatively speaking, than that through the moisture separator. Therefore, the flow velocity will be higher through the reheater than through the separator, preferably at least 4 to 1. Since the pressure drops are roughly related to the square of the velocity, this means that the pressure drop through the moisture separator is negligible relative to that in the reheater. The effect of a downstream resistance forcing uniform distribution through a number of upstream passages is understood in the art and acts to cause uniform distribution among separator elements in the present design.

Thus, there has been described an improved compact configuration for a combined moisture separator and reheater. Other modifications will occur to those skilled in the art and it is desired to cover in the appended claims all such modifications as fall within the true spirit and scope of the invention.

What is claimed as new and desire to secure by Letters Patent of the United States is:

1. A combined moisture separator and reheater comprising:
    a substantially cylindrical pressure-tight shell defining inlet and outlet openings therein,
    a plurality of longitudinally extending plates together defining a vertical passage substantially on the shell vertical center line,
    a plurality of horizontal heat exchange tubes disposed in said passage with means to heat the tubes,
    a pair of banks of inertial moisture separator elements, said banks being disposed symmetrically on opposite sides of the passage, said longitudinal plates and said banks together defining a pair of longitudinally extending supply manifolds on either side of the casing communicating with said inlet opening in the shell,
    the moisture separator elements being disposed to redirect the flow transversely while separating moisture from fluid passing therethrough,
    a plurality of transverse plates disposed between said moisture separator banks and the heat exchange tubes for conducting separate flow portions from the separator elements to the inlet of said vertical passage, and
    means conducting fluid from the outlet of said vertical passage to an outlet opening in the shell.

2. The combination according to claim 1 wherein the inlet opening is in one end of the shell and including an internal fluid impingement shield spanning the inlet opening and spaced from the shell and shaped to diffuse fluid entering the opening and passing between said shield and the shell toward said supply manifolds.

3. The combination according to claim 1, wherein the total effective flow area through said separator banks and the total effective flow area through said heat exchange tubes is preselected to achieve flow velocity through the tubes at least four times as great as the flow velocity through the separator elements so that the greatest portion of the overall pressure drop through the combined moisture separator and reheater takes place in the reheater portion, whereby uniform flow distribution is forced to take place among the separator elements.

4. The combination according to claim 1, wherein said heat exchange tubes are disposed in two stages supplied from separate heated fluid sources, one stage being disposed vertically above the other.

5. The combination according to claim 1, wherein said moisture separator elements comprise zig-zag plate members arranged with their major dimensions extending in a direction which is slightly inclined from the vertical and disposed in the lower half of said casing.

6. The combination according to claim 1, wherein a longitudinal plate member on the shell vertical center line extends between said transverse plate members and further separates the flow portions passing into said vertical passage into two halves.

7. The combination according to claim 1, including an arcuate longitudinally extending plate disposed near the bottom of the casing wall and spaced therefrom to define a moisture removal channel, said arcuate plate extending between said moisture separator banks.

* * * * *